(12) United States Patent
Hamasaki

(10) Patent No.: US 8,117,355 B2
(45) Date of Patent: Feb. 14, 2012

(54) DATA PROCESSING APPARATUS AND METHOD THAT MONITORS AND CONTROLS MOUNTING AND UNMOUNTING OF A REMOVABLE STORAGE DEVICE

(75) Inventor: Takanari Hamasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 240 days.

(21) Appl. No.: 12/399,394

(22) Filed: Mar. 6, 2009

(65) Prior Publication Data

US 2009/0234979 A1 Sep. 17, 2009

(30) Foreign Application Priority Data

Mar. 17, 2008 (JP) ................................ 2008-068464

(51) Int. Cl.
*G06F 3/00* (2006.01)
*G06F 11/00* (2006.01)
(52) U.S. Cl. ......................................... 710/16; 702/188
(58) Field of Classification Search ............... 710/16; 702/188
See application file for complete search history.

(56) References Cited

U.S. PATENT DOCUMENTS

| | | | | |
|---|---|---|---|---|
| 6,085,265 A * | 7/2000 | Kou | ................................. | 710/63 |
| 2003/0023410 A1* | 1/2003 | Roth | ............................. | 702/188 |
| 2004/0205293 A1* | 10/2004 | Asahi | ............................ | 711/114 |
| 2006/0236026 A1* | 10/2006 | Hempel | ........................ | 711/103 |

FOREIGN PATENT DOCUMENTS

| | | |
|---|---|---|
| JP | 4-344920 | 12/1992 |
| JP | 3183781 | 4/2001 |
| JP | 2005-174241 | 6/2005 |
| JP | 4037315 | 11/2007 |

* cited by examiner

*Primary Examiner* — Henry Tsai
*Assistant Examiner* — Hyun Nam
(74) *Attorney, Agent, or Firm* — Oblon, Spivak, McClelland, Maier & Neustadt, L.L.P.

(57) ABSTRACT

A data processing apparatus includes an operating system that performs a mounting and an unmounting of a removable external storage device; a plurality of application programs each configured to independently access the external storage device; and an external-storage-device monitoring unit that instructs the operating system, based on a request for mounting or unmounting the external storage device, which is output from each of the application programs, to perform the mounting and the unmounting of the external storage device.

10 Claims, 11 Drawing Sheets

| MOUNT PATH (MOUNT POINT) | USAGE STATUS | EXTERNAL STORAGE DEVICE TYPE | ACCESS MODE |
|---|---|---|---|
| /mnt/ext1 | ON | SD MEMORY CARD | READ/WRITE |
| /mnt/ext2 | OFF | | |
| /mnt/ext3 | ON | USB FLASH MEMORY | READ ONLY |

| MOUNT PATH (MOUNT POINT) | PROHIBITION FLAG | APPLICATION TYPE |
|---|---|---|
| /mnt/ext1 | ON | PRINTER APPLICATION |
| /mnt/ext2 | OFF | |
| /mnt/ext3 | OFF | | ial serial bus (USB) flash memory and a secure digital
DATA PROCESSING APPARATUS AND METHOD THAT MONITORS AND CONTROLS MOUNTING AND UNMOUNTING OF A REMOVABLE STORAGE DEVICE

CROSS-REFERENCE TO RELATED APPLICATIONS

The present application claims priority to and incorporates by reference the entire contents of Japanese priority document 2008-068464 filed in Japan on Mar. 17, 2008.

BACKGROUND OF THE INVENTION

1. Field of the Invention

The present invention relates to a technology for mounting/unmounting a removable external storage device in a data processing apparatus.

2. Description of the Related Art

Recently, usage of external storage devices such as a universal serial bus (USB) flash memory and a secure digital (SD) memory card (registered trademark) is becoming increasingly common. Data stored in the external storage device can be transferred between various devices. For example, with the external storage device, image data that is shot by a digital camera can be viewed and processed on a personal computer (PC). A necessity to use such a removable external storage device is also increasing in a multifunction peripheral (MFP), which is an image forming apparatus having a plurality of functions including a scanner, a printer, etc. For example, in the MFP, scanned image data can be saved in the external storage device and the image data saved in the external storage device can be printed.

When using the external storage device in a system using an operating system (OS) such as the Unix (registered trademark), an explicit or implicit mounting/unmounting operation is required. The "mounting" means an operation to allocate a necessary resource that enables to access the internal portion of the external storage device on the system. Various technologies related to the mounting of the external storage device have been proposed. For example, in a technology disclosed in Japanese Patent Application Laid-open No. 2005-174241, upon notifying a specific application that an external storage device is inserted, the application activates a mounting process. In another technology disclosed in Japanese Patent Application Laid-open No. 2004-46801, upon insertion of an external storage device, the external storage device is automatically mounted.

On the contrary, the "unmounting" means an operation to release the resource allocated during the mounting and to ensure that data inside the external storage device is consistent. The unmounting of the external storage device is necessary because data from the external storage device is cached in the system (for example, on a main memory, etc.) for a high speed access to the external storage device on the OS. Recently, a technology called "journaling file system" is used to minimize data corruption due to a sudden power failure. In the journaling file system, a write-back of a journal (data) and the like are performed. Thus, a failure to perform the unmounting of the external storage device may result in that data that should be written back to the external storage device on the system is not actually written to the external storage device. A removal of the external storage device while data is being written to the external storage device may result in a serious problem such as lack of data integrity inside the external storage device.

In a method used by a PC system based on, for example, the Windows (registered trademark), upon detecting a connection of the external storage device, the system automatically mounts the device. At the time of unmounting the device, the system prompts a user to unmount the external storage device via a graphical user interface (GUI).

However, in a non-PC system such as the MFP, it is not desirable to explicitly issue an instruction to unmount the external storage device to a user. In some cases, the user may accidentally switch off the power source. If the power source is accidentally switched off while the external storage device is connected to the MFP, the data cached in the system is not actually written back to the external storage device and the data in the external storage device may get corrupted. In the MFP, various applications such as the scanner and the printer are operating independently. Thus, it is desired that the applications use the external storage device without interfering with each other.

SUMMARY OF THE INVENTION

It is an object of the present invention to at least partially solve the problems in the conventional technology.

According to an aspect of the present invention, there is provided a data processing apparatus including an operating system that performs a mounting and an unmounting of a removable external storage device; a plurality of application programs each configured to independently access the external storage device; and an external-storage-device monitoring unit that instructs the operating system, based on a request for mounting or unmounting the external storage device, which is output from each of the application programs, to perform the mounting and the unmounting of the external storage device.

According to another aspect of the present invention, there is provided a data processing method that is performed in a data processing apparatus that includes an operating system that performs a mounting and an unmounting of a removable external storage device and a plurality of application programs each configured to independently access the external storage device, the data processing method includes instructing the operating system, based on a request for mounting or unmounting the external storage device, which is output from each of the application programs, to perform the mounting and the unmounting of the external storage device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained below with reference to the accompanying drawings. In the embodiments explained below, the data processing apparatus and the data processing method according to the present invention are applied to a multifunction peripheral (MFP) that combines a printing function, an image reading (scanning) function, etc. However, the present invention is not to be thus limited, and can be similarly applied to a personal computer (PC) and a data processing apparatus such as a stand-alone copier or printer.

Figure 1:
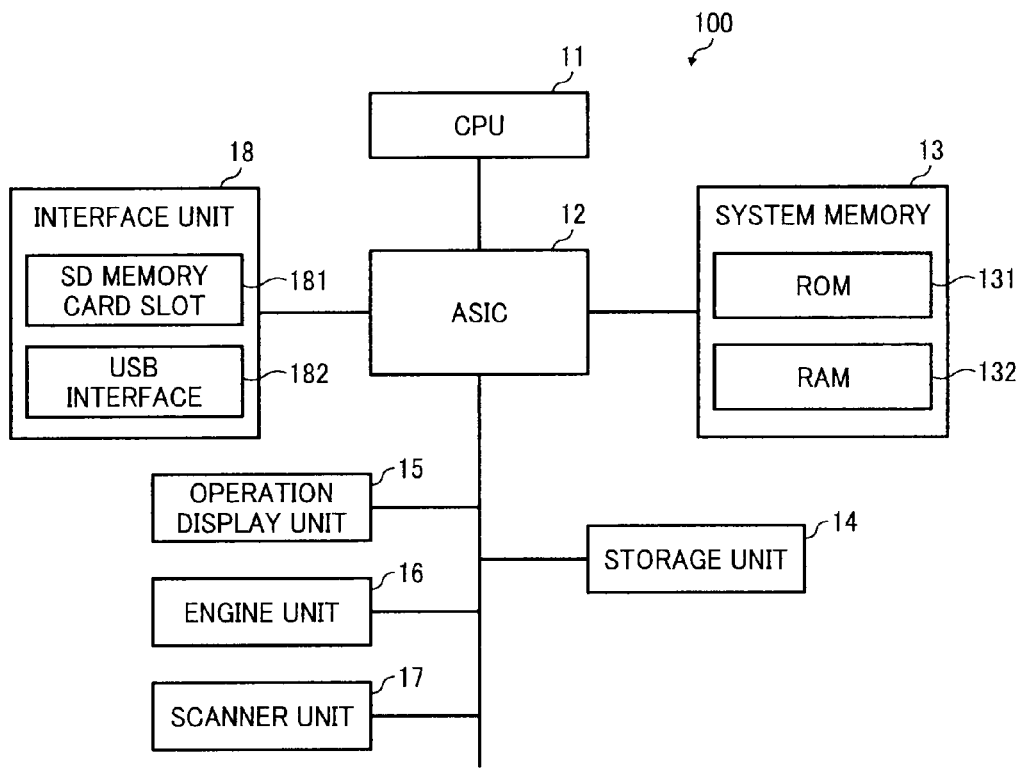
FIG. 1 is a block diagram of an MFP according to a first embodiment of the present invention.

FIG. 1 is a block diagram of an MFP 100 according to a first embodiment of the present invention. As shown in FIG. 1, the MFP 100 includes a central processing unit (CPU) 11, an application-specific integrated circuit (ASIC) 12, a system memory 13, a storage unit 14, an operation display unit 15, an engine unit 16, a scanner unit 17, and an interface unit 18.

The CPU 11 uses as a working area, a predetermined area of the system memory 13 (a random access memory (RAM) 132), executes various processes by cooperating with various control programs that are stored in a read only memory (ROM) 131 or in the storage unit 14 in advance, and controls all the operations of the MFP 100.

The ASIC 12 is an integrated circuit (IC) for image processing that includes hardware elements that are used for image processing. The ASIC 12 functions as a bridge and connects the CPU 11 to each component.

The system memory 13 is used as a memory for storing therein computer programs and data, as a memory for loading the computer programs and the data, and as a drawing memory of the printer. The system memory 13 includes the ROM 131 and the RAM 132. The ROM 131 is used for storing therein the computer programs and the data. The RAM 132 is a readable/writable volatile memory used as the memory to load the computer programs and the data and as the drawing memory of the printer. When accessing an external storage device (a secure digital (SD) card memory, a universal serial bus (USB) flash memory) that is explained later, caching of data related to the external storage device is performed in the RAM 132 for ensuring a high speed access to the external storage device.

The storage unit 14 includes a magnetically or optically recordable storage medium. The storage unit 14 rewritably stores therein the computer programs and various setting data that are related to control of the MFP 100. The storage unit 14 also stores therein image data that is input via the scanner unit 17 and the interface unit 18.

The operation display unit 15 functions as an interface between the MFP 100 and a user. The operation display unit 15 includes a display device such as a liquid crystal display (LCD) and an input device such as a key switch. The operation display unit 15 displays, under control of the CPU 11, various status and operating methods of the MFP 100. The operation display unit 15 also detects an input from the user via a touch panel or a key switch group, and outputs the input to the CPU 11.

The engine unit 16 is a printer engine such as a black and white plotter, a one-drum color plotter, a four-drum color plotter, a scanner, or a fax unit. In addition to an engine portion such as the plotter, the engine unit 16 also includes an image processing portion such as an error diffuser and a gamma transformer.

The scanner unit 17 includes a line sensor, which is formed of charge coupled device (CCD) photoelectric transducers, an analog-to-digital (A/D) converter, and a driving circuit of the line sensor and the A/D converter. The scanner unit 17 scans an original that is set, generates, based on obtained grayscale data of the original, digital image data that includes eight bits each of red, green, and blue (RGB) colors, and outputs the digital image data to the CPU 11.

The interface unit 18 connects the removal external storage device to the MFP 100. Specifically, the interface unit 18 includes an SD memory card slot 181 and a USB interface 182. The SD card memory (registered trademark), which is the external storage device, is inserted into the SD memory card slot 181. Similarly, the USB flash memory, which is also the external storage device, is inserted into the USB interface 182. Hereinafter, the SD card memory and the USB flash memory are collectively called "external storage device".

In the first embodiment, the interface unit 18 includes an interface for connecting the SD card memory and the USB flash memory to the MFP 100. However, the present invention is not to be thus limited, and the interface unit 18 can also include an interface for connecting to a memory device such as a compact flash (registered trademark) card, or to a device that conforms to institute of electrical and electronics engineers (IEEE) 1394 standards.

Figure 2:
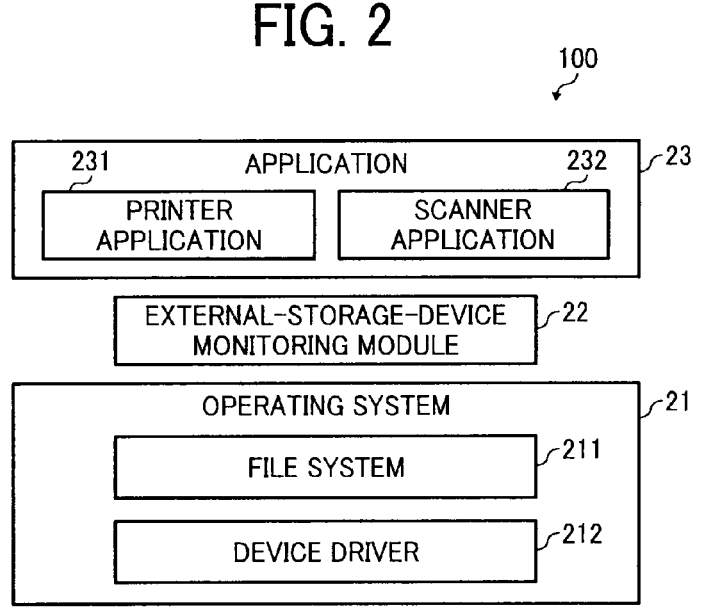
FIG. 2 is a block diagram of the MFP shown in FIG. 1.

Various functioning units, which are realized by cooperation between the CPU 11 and the computer programs that are stored in the ROM 131 or the storage unit 14, are explained next with reference to FIG. 2. FIG. 2 is a block diagram of the MFP 100.

As shown in FIG. 2, the MFP 100 includes an operating system 21, an external-storage-device monitoring module 22, and an application 23.

The operating system 21 is a general-purpose operating system such as the Unix (registered trademark). The operating system 21 parallely executes as respective process, respective software of the external-storage-device monitoring module 22 and the application 23.

The operating system 21 includes a file system 211 and a device driver 212. The file system 211 controls a file system of the external storage device that is inserted into the storage unit 14 and into the interface unit 18. According to a command from the external-storage-device monitoring module 22, the file system 211 executes mounting/unmounting of the external storage device. A mount point of the external storage device, which is connected to the SD memory card slot 181 and the USB interface 182, is assumed to be stipulated by the file system 211.

The device driver 212 controls the access to the external storage device that is inserted into the interface unit 18. The device driver 212 detects an insertion status (an attachment status) of the external storage device due to interruption from the SD memory card slot 181 and the USB interface 182 and notifies of the mount point of the external storage device, thereby notifying the external-storage-device monitoring module 22 of insertion or removal of the external storage device.

The external-storage-device monitoring module 22 controls mounting/unmounting of the external storage device that is inserted into the interface unit 18. According to a request from each application of the application 23, the external-storage-device monitoring module 22 instructs mounting/unmounting of the external storage device to the operating system 21. An operation of the external-storage-device monitoring module 22 is explained in detail later.

The application 23 includes a printer application 231 and a scanner application 232. The printer application 231 is software for printing and includes a page description language (PDL) (a printer command language (PCL)), and a post script (PS). The scanner application 232 is software for a scanner. Under control of the operating system 21, the printer application 231 and the scanner application 232 output to the external-storage-device monitoring module 22, according to a necessity of reading and writing of data, signals that request mounting of the external storage device. Hereinafter, the signals are called "mounting request". The mounting request at least includes data (for example, a mount path) that specifies the external storage device that is a mounting target.

Upon completion of a process with respect to the external storage device, the printer application 231 and the scanner application 232 of the application 23 output to the external-storage-device monitoring module 22, signals that request unmounting of the external storage device. Hereinafter, the signals are called "unmounting request". The unmounting request at least includes data (for example, a mount path) that specifies the external storage device that is an unmounting target.

In the first embodiment, the application 23 includes the printer application 231 and the scanner application 232. However, the present invention is not to be thus limited, and applications according to functions of the MFP 100 (for example, a copy application that is software for copying, a fax application that is software for a facsimile, and a net file application that is software for a network file) can also be included.

An operation that is performed by the MFP 100 related to mounting/unmounting of the external storage device is explained next. First, in an operation that is explained with reference to FIG. 3, a single application (the printer application 231) requests mounting/unmounting of the external storage device.

Figure 3:
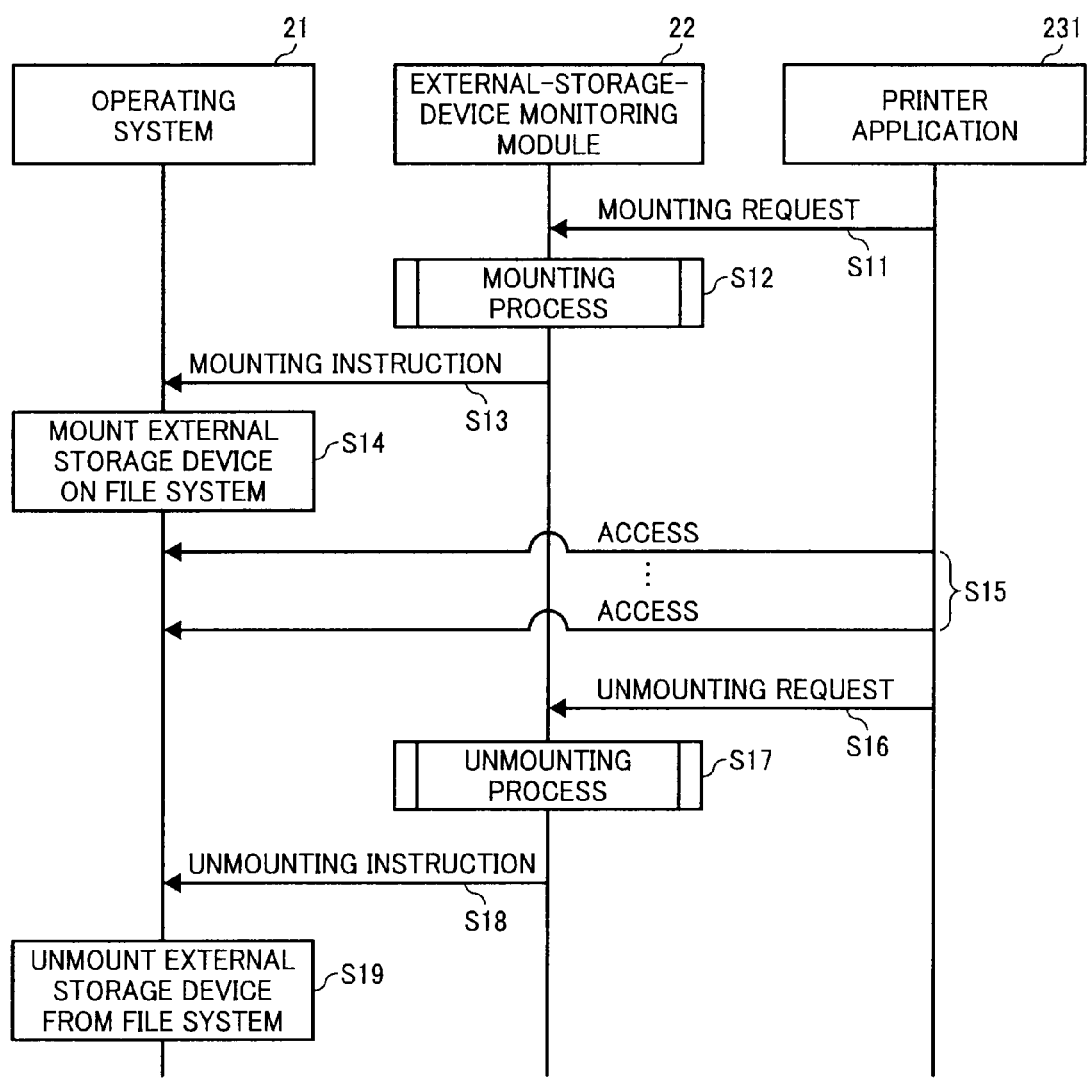
FIG. 3 is a flowchart of a process sequence that is performed at the time of mounting/unmounting of an external storage device.

FIG. 3 is a flowchart of a process sequence that is performed between the operating system 21, the external-storage-device monitoring module 22, and the printer application 231 at the time of mounting/unmounting of the external storage device. In the process, it is prior assumed that the external storage device is already inserted into any one of the SD memory card slot 181 and the USB interface 182 or both, that the external storage device is still not mounted, and that the device driver 212 has notified the external-storage-device monitoring module 22 of the insertion of the external storage device.

First, along with reading of the image data related to printing, upon occurrence of a necessity to access the specified external storage device, the printer application 231 outputs a mounting request of the external storage device to the external-storage-device monitoring module 22 (Step S11).

Upon receiving the mounting request from the printer application 231, the external-storage-device monitoring module 22 executes a mounting process (Step S12). The mounting process at Step S12 is explained with reference to a flowchart shown in FIG. 4. The mounting process is executed independently for each type of the external storage device.

Figure 4:
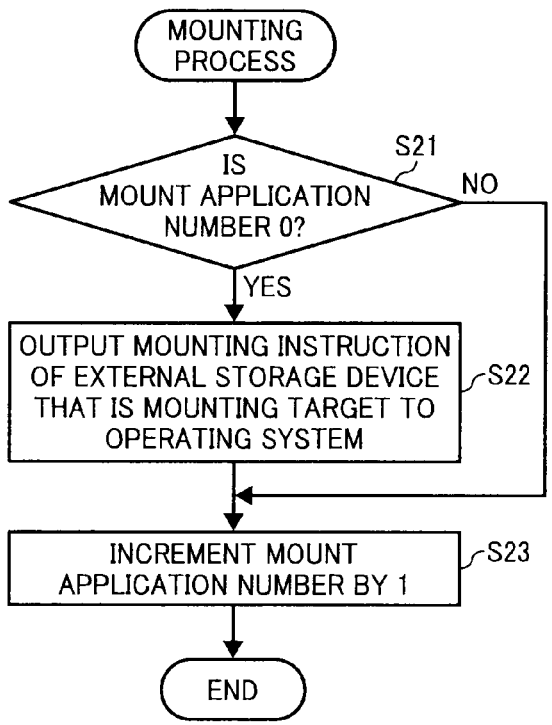
FIG. 4 is a flowchart of a mounting process according to the first embodiment.

FIG. 4 is a flowchart of the mounting process according to the first embodiment. First, the external-storage-device monitoring module 22 determines, for the external storage device that is a mounting target of the received mounting request, whether a mount application number that indicates the number of applications that are mounting targets until the current mounting request is zero (Step S21). Counting of the number of applications is performed in units of application type.

Upon determining that the mount application number is not zero (No at Step S21), the external-storage-device monitoring module 22 immediately moves to a process at Step S23.

Upon determining that the mount application number is zero (Yes at Step S21), the external-storage-device monitoring module 22 outputs to the operating system 21, signals that instruct mounting of the external storage device that is the mounting target of the current mounting request (Step S22), and moves to the process at Step S23.

At Step S23, the external-storage-device monitoring module 22 increments the mount application number by one (Step S23) and ends the mounting process. If the insertion of the external storage device that is specified by the mounting request is not notified from the device driver 212, the external-storage-device monitoring module 22 can also output to the printer application 231, data to the effect that the external storage device is not yet inserted.

Returning to FIG. 3, because the mounting request is issued only by the printer application 231, the external-storage-device monitoring module 22 determines, at Step S21 of the mounting process shown in FIG. 4, that the mount application number is zero, and instructs the operating system 21 to mount the external storage device (Step S13).

Upon receiving the instruction to mount the external storage device from the external-storage-device monitoring module 22, the operating system 21 mounts the instructed external storage device on the file system 211 (Step S14).

Next, the printer application 231 accesses the mounted external storage device (Step S15). Upon completing the access to the external storage device, the printer application 231 outputs to the external-storage-device monitoring module 22, an unmounting request of the mounted external storage device (Step S16).

Upon receiving the unmounting request of the external storage device from the printer application 231, the external-storage-device monitoring module 22 executes an unmounting process (Step S17). The unmounting process at Step S17 is explained with reference to a flowchart shown in FIG. 5. Similarly to the mounting process, the unmounting process is executed independently for each type of the external storage device.

First, the external-storage-device monitoring module 22 decrements by one, the mount application number that is counted for the external storage device that is an unmounting target (Step S31). Next, the external-storage-device monitoring module 22 determines whether the mount application number is zero. Upon determining that the mount application number is not zero (No at Step S32), the external-storage-device monitoring module 22 ends the unmounting process.

Upon determining that the mount application number is zero at Step S32 (Yes at Step S32), the external-storage-device monitoring module 22 outputs to the operating system 21, signals that instruct unmounting of the external storage device that is the unmounting target of the unmounting request (Step S33) and ends the unmounting process.

Figure 5:
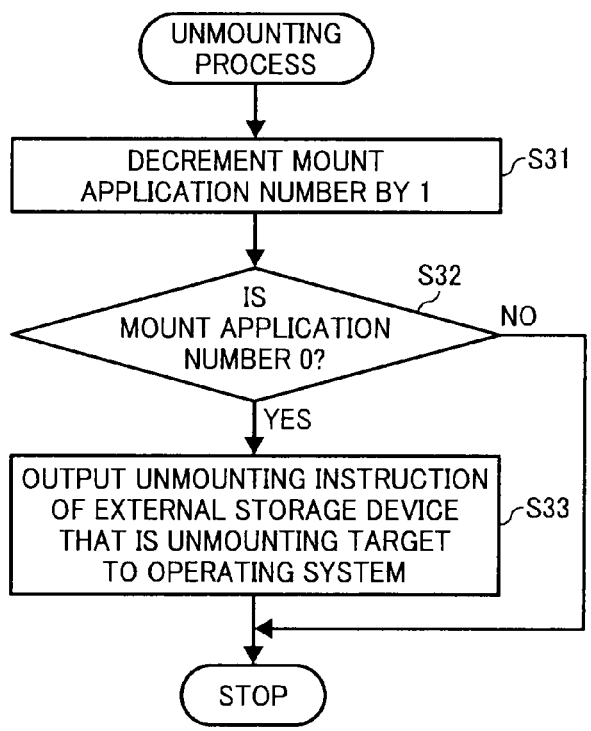
FIG. 5 is a flowchart of an unmounting process according to the first embodiment.

Returning to FIG. 3, because the mounting request is issued only from the printer application 231, the mount application number at Step S31 of the unmounting process shown in FIG. 5 becomes zero. Due to this, based on Step S32 of the unmounting process, the external-storage-device monitoring module 22 instructs the operating system 21 to unmount the external storage device that is the unmounting target of the unmounting request (Step S18).

Upon receiving from the external-storage-device monitoring module 22, the instruction to unmount the external storage device, the operating system 21 unmounts the instructed external storage device from the file system 211 (Step S19). At the time of unmounting, the operating system 21 executes a process to write back to the external storage device, data and journal that are cached in the system memory 13 (the RAM 132) for ensuring a high-speed access to the external storage device. After unmounting, the external storage device can be removed from the interface unit 18.

In an operation that is explained with reference to FIG. 6, mounting/unmounting of the external storage device is requested from a plurality of applications (the printer application 231 and the scanner application 232).

Figure 6:
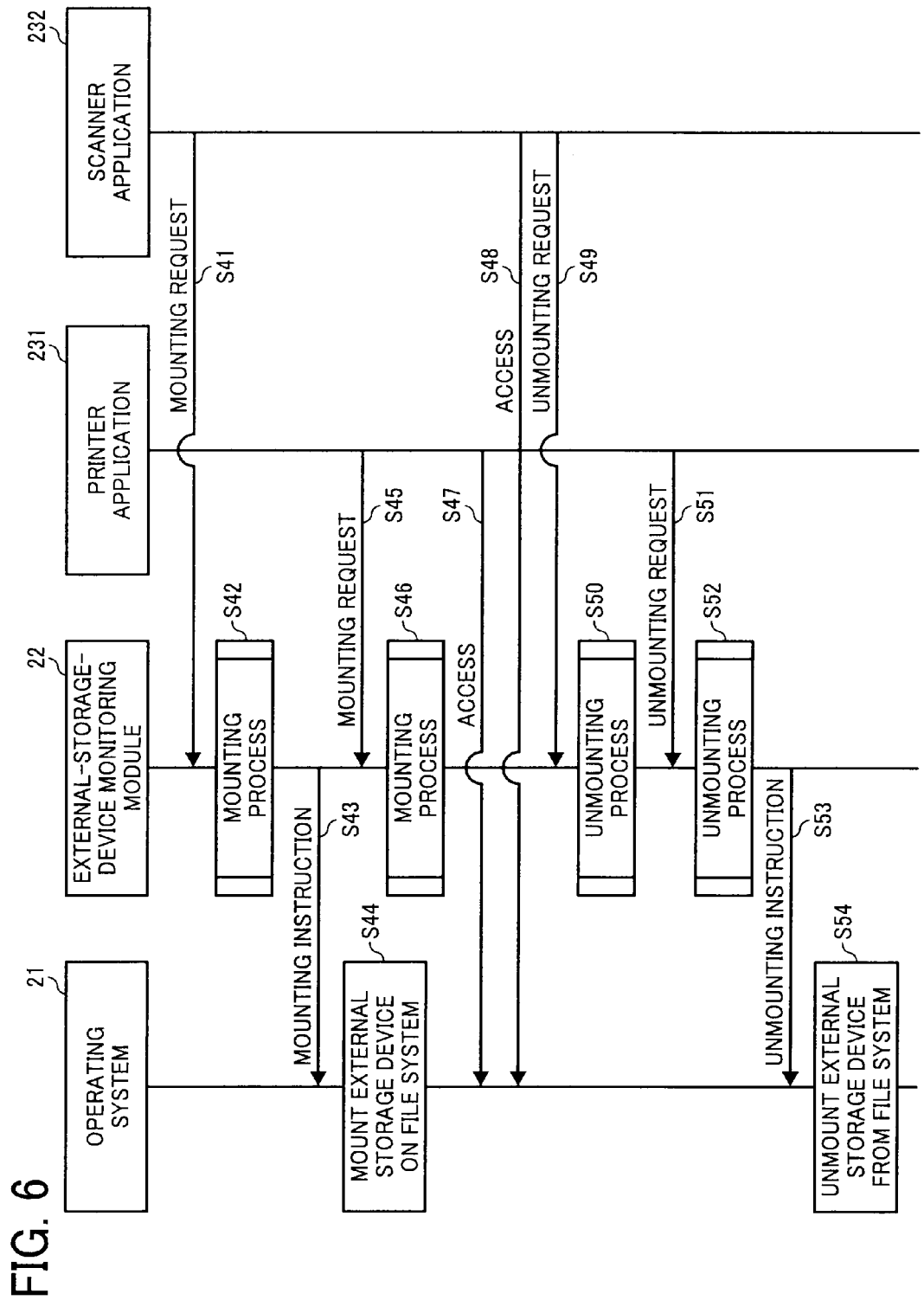
FIG. 6 is a flowchart of a process sequence that is performed at the time of mounting/unmounting of the external storage device.

FIG. 6 is a flowchart of a process sequence that is performed between the operating system 21, the external-storage-device monitoring module 22, and the application 23 (the printer application 231 and the scanner application 232) at the time of mounting/unmounting of the external storage device. In the process, it is prior assumed that the external storage device is already inserted into any one of the SD memory card slot 181 and the USB interface 182 or both, that the external storage device is still not mounted, and that the device driver 212 has notified the external-storage-device monitoring module 22 of the insertion of the external storage device.

First, along with writing of the scanned image data, upon occurrence of a necessity to access the specified external storage device, the scanner application 232 outputs a mounting request of the external storage device to the external-storage-device monitoring module 22 (Step S41).

Upon receiving the mounting request from the scanner application 232, the external-storage-device monitoring module 22 executes the mounting process mentioned earlier (Step S42). Because the mounting request is issued only from the scanner application 232, the external-storage-device monitoring module 22 determines, at Step S21 of the mounting process, that the mount application number is zero, and instructs the operating system 21 to mount the external storage device (Step S43).

Upon receiving the instruction to mount the external storage device from the external-storage-device monitoring module 22, the operating system 21 mounts the instructed external storage device on the file system 211 (Step S44).

It is assumed that after the scanner application 232 has issued the mounting request, the printer application 231 outputs a mounting request of the specific external storage device to the external-storage-device monitoring module 22 (Step S45). Upon receiving the mounting request from the printer application 231, the external-storage-device monitoring module 22 executes a mounting process similar to the mounting process at Step S42 (Step S46).

If the printer application 231 has requested mounting of the same external storage device that is the mounting target of the mounting request issued by the scanner application 232, the external-storage-device monitoring module 22 determines, at Step S21 of the mounting process shown in FIG. 4, that the mount application number is one. In other words, because the external storage device that is the mounting target of the mounting request from the printer application 231 is already mounted on the file system 211, the external-storage-device monitoring module 22 does not output a mounting instruction to the operating system 21, and only increments the mount application number at Step S23 by one. Next, the printer application 231 and the scanner application 232 access the external storage device that is mounted on the file system 211 (Steps S47 and S48).

Next, upon completing the access to the external storage device, the scanner application 232 outputs to the external-storage-device monitoring module 22, an unmounting request of the mounted external storage device (Step S49).

Upon receiving the unmounting request of the external storage device from the scanner application 232, the external-storage-device monitoring module 22 executes the unmounting process mentioned earlier (Step S50). Because the mounting request is issued from the printer application 231 and the scanner application 232, the external-storage-device monitoring module 22 determines, at Step S31 of the unmounting process shown in FIG. 5, that the mount application number is one. In other words, because the external storage device that is the unmounting target of the unmounting request from the scanner application 232 is also being used by the printer application 231, the external-storage-device monitoring module 22 ends the process without outputting an unmounting instruction to the operating system 21.

Next, upon completing the access to the external storage device, the printer application 231 outputs to the external-storage-device monitoring module 22, an unmounting request of the mounted external storage device (Step S51).

Upon receiving the unmounting request from the printer application 231, the external-storage-device monitoring module 22 executes an unmounting process similar to the unmounting process at Step S49 (Step S52). Because the unmounting process related to the scanner application 232 is executed at Step S49, the external-storage-device monitoring module 22 determines, at Step S31 of the unmounting process shown in FIG. 5, that the mount application number is zero. Due to this, based on Step S33 of the unmounting process, the external-storage-device monitoring module 22 instructs the operating system 21 to unmount the external storage device that is the unmounting target of the unmounting request (Step S53).

Upon receiving the instruction from the external-storage-device monitoring module 22 to unmount the external storage device, the operating system 21 unmounts the external storage device that is the unmounting target from the file system 211 (Step S54).

According to the first embodiment, based on a mounting/unmounting request from each of the printer application 231 and the scanner application 232, the external-storage-device monitoring module 22 collectively controls mounting/unmounting of the external storage device. Due to this, unmounting of the external storage device can be performed in units of application without necessitating an explicit unmounting instruction from the user. The printer application 231 and the scanner application 232 can independently perform mounting/unmounting of the external storage device without interfering with each other.

When one application is requesting mounting of the external storage device, the unmounting request from the other application can be discarded. Thus, unmounting of the external storage device during an access to the external storage device can be prevented.

A second embodiment of the present invention is explained next. In the second embodiment, insertion of the external storage device into the interface unit 18 can be notified to the application 23. In the second embodiment, components that are similar to those of the first embodiment are indicated by the same reference numerals and a detailed explanation is omitted.

Figure 7:
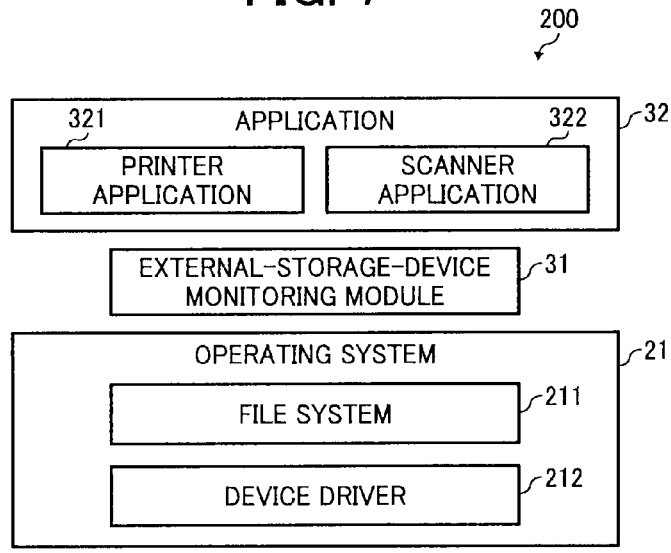
FIG. 7 is a block diagram of an MFP according to a second embodiment of the present invention.

FIG. 7 is a block diagram of an MFP 200 according to the second embodiment. Because a hardware configuration of the MFP 200 is similar to that of the MFP 100 shown in FIG. 1, an explanation is omitted.

As shown in FIG. 7, the MFP 200 includes the operating system 21, an external-storage-device monitoring module 31, and an application 32.

Similarly to the application 23 mentioned earlier, the application 32 includes a printer application 321 and a scanner application 322. Apart from including functions that are similar to the functions of the printer application 231 and the scanner application 232 respectively, the printer application 321 and the scanner application 322 output to the external-storage-device monitoring module 31, before outputting a mounting request to the external-storage-device monitoring module 31, signals that request a notification to the effect that the external storage device is connected to the MFP 200. Hereinafter, the signals are called "connection notification request".

Apart from including functions that are similar to the functions of the external-storage-device monitoring module 22 mentioned earlier, upon receiving from the device driver 212, a notification of insertion of the external storage device, the external-storage-device monitoring module 31 notifies the application 32 that has output the connection notification request of a notification to the effect that the external storage device is connected to the MFP 200.

Figure 8:
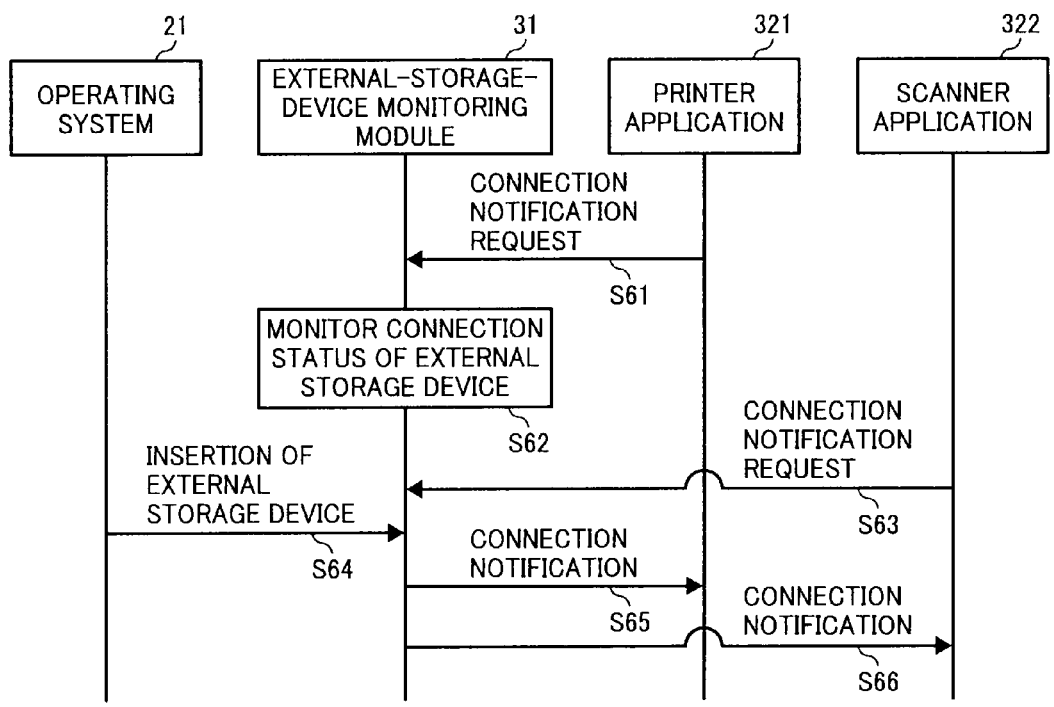
FIG. 8 is a flowchart of a process sequence that is performed at the time of inserting the external storage device.

An operation of the MFP 200 according to the second embodiment is explained next with reference to FIG. 8. FIG. 8 is a flowchart of a process sequence that is performed between the operating system 21, the external-storage-device monitoring module 31, and the application 32 (the printer application 321 and the scanner application 322) at the time of insertion (mounting) of the external storage device.

First, the printer application 321 outputs the connection notification request to the external-storage-device monitoring module 31 (Step S61). Upon receiving the connection notification request, the external-storage-device monitoring module 31 stores in the RAM 132 or in the storage unit 14, an application name of the printer application 321 that has output the connection notification request. Next, the external-storage-device monitoring module 31 awaits a notification from the device driver 212, thus monitoring a connection status of the external storage device (Step S62).

The scanner application 322 outputs a connection notification request to the external-storage-device monitoring module 31 (Step S63). Upon receiving the connection notification request, the external-storage-device monitoring module 31 stores in the RAM 132 or in the storage unit 14, an application name of the scanner application 322 that has output the connection notification request, and continues the monitoring process at Step S62.

Upon the user inserting the external storage device into the interface unit 18, the operating system 21 (the device driver 212) notifies the external-storage-device monitoring module 31 that the external storage device has been inserted (Step S64). It is assumed that the external storage device is inserted into any one of the SD memory card slot 181 and the USB interface 182 or both. It is further assumed that data (for example, the mount point) for identifying the inserted external storage device is notified to the external-storage-device monitoring module 31.

Upon receiving the notification of insertion of the external storage device from the operating system 21, the external-storage-device monitoring module 31 notifies each application that is stored in the RAM 132 that the external storage device is connected to the MFP 200 (Steps S65 and S66), and ends the process.

Upon receiving a connection notification, the printer application 321 and the scanner application 322 output to the external-storage-device monitoring module 31, based on a necessity of reading and writing of data, a mounting request of the external storage device that is notified by the connection notification. The printer application 321 and the scanner application 322 can also exercise control to ensure that a mounting request is not issued for the external storage device that is not specified by the connection notification.

Thus, according to the second embodiment, each of the printer application 321 and the scanner application 322 does not need to separately confirm the insertion status of the external storage device. Due to this, the process performed by each of the printer application 321 and the scanner application 322 can be simplified.

In the second embodiment, the connection notification is returned only to the application that has issued the connection notification request. However, the present invention is not to be thus limited, and the connection notification can also be output to all the applications regardless of whether the application has issued the connection notification request. Only the process at the time of insertion of the external storage device is explained in the second embodiment. However, each application can also be notified at the time of removal of the external storage device in the similar manner.

A third embodiment of the present invention is explained next. Under an operating system environment such as the Unix (registered trademark), accessing all the storage media including the external storage device necessitates a path name that is mounted on the file system (for example, "/mnt/sd-card", etc.). Some external storage devices have a write-protect switch. In such external storage devices, data cannot be written even if the external storage device is mounted. Because the application 23, which actually accesses the external storage devices, needs data related to the external storage device, each application is desirably notified of the data before the application issues a mounting request. In the third embodiment, data related to the external storage device can be notified to the application 23 at the time of inserting the external storage device. In the third embodiment, components that are similar to those of the first and the second embodiments are indicated by the same reference numerals and an explanation is omitted.

Figures 9, 10:
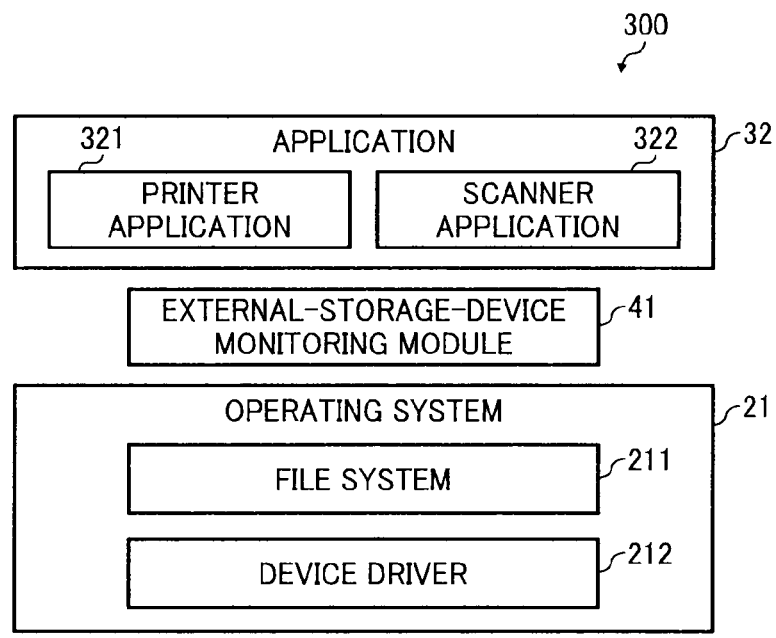
FIG. 9 is a block diagram of an MFP according to a third embodiment of the present invention.
FIG. 10 is a schematic diagram of an example of an external-storage-device control table according to the third embodiment.

FIG. 9 is a block diagram of an MFP 300 according to the third embodiment. Because a hardware configuration of the MFP 300 is similar to that of the MFP 100 shown in FIG. 1, an explanation is omitted.

As shown in FIG. 9, the MFP 300 includes the operating system 21, an external-storage-device monitoring module 41, and the application 32.

Apart from including functions that are similar to the functions of the external-storage-device monitoring module 31 mentioned earlier, upon receiving from the device driver 212, a notification of insertion of the external storage device, the external-storage-device monitoring module 41 obtains the data related to the external storage device via the operating system 21 and records the obtained data as external-storage-device-related data in an external-storage-device control table that is stored in the storage unit 14.

FIG. 10 is a schematic diagram of an example of the external-storage-device control table that is stored in the storage unit 14. As shown in FIG. 10, the external-storage-device control table includes four items of "mount path", "usage status", "external storage device type", and "access mode".

"Mount path" is the mount point of the external storage device controlled by the file system 211. Three mount paths (/mnt/ext1, /mnt/ext2, and /mnt/ext3) are recorded in advance in the external-storage-device control table shown in FIG. 10.

Data that indicates whether the mount path is being used is recorded in "usage status". Based on data, which is notified from the device driver 212, of insertion or removal of the external storage device, the external-storage-device monitoring module 41 switches to used (on) or unused (off), "usage status" of the mount path related to the external storage device.

A type of the external storage device mounted on the mount path is recorded in "external storage device type". Upon obtaining the type of the external storage device via the operating system 21, the external-storage-device monitoring module 41 records the obtained type in "external storage device type" of the corresponding external storage device (mount path).

An access mode of the external storage device mounted on the mount path is recorded in "access mode". Upon obtaining the access mode of the external storage device via the operating system 21, the external-storage-device monitoring module 41 records the obtained access mode in "access mode" of the corresponding external storage device (mount path). As shown in FIG. 10, the external storage device (SD card memory) mounted on the mount path "/mnt/ext1" is in "read/write" mode. The external storage device (USB flash memory) mounted in the mount path "/mnt/ext3" is in "read only" mode.

The external-storage-device monitoring module 41 notifies the application 32 of the data (external-storage-device-related data) that is recorded in the external-storage-device control table. The external-storage-device-related data can be notified along with the connection notification that is explained in the second embodiment. Alternatively, the external-storage-device-related data can also be notified when each application has issued a mounting request.

Figure 11:
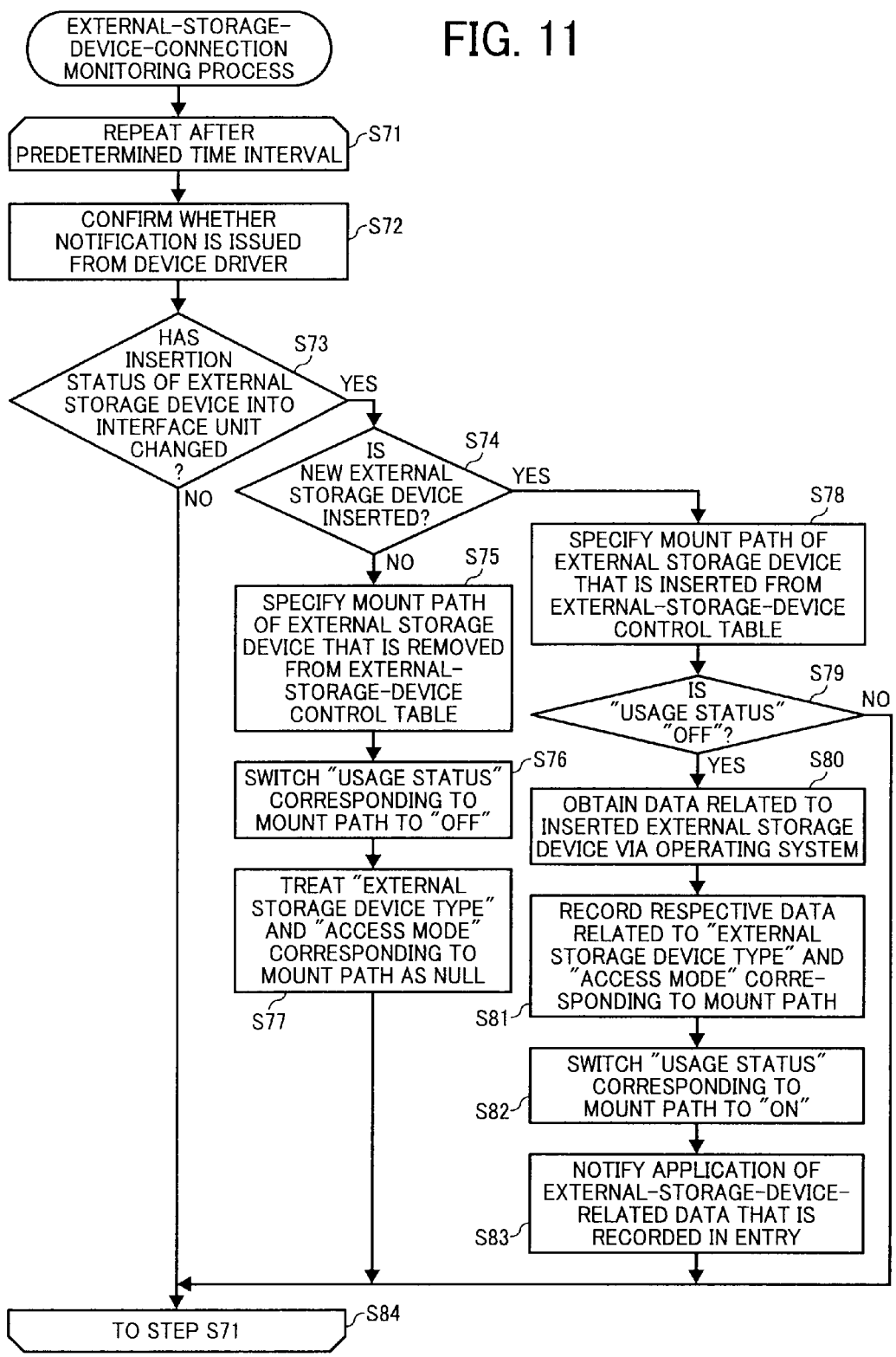
FIG. 11 is a flowchart of an external-storage-device-connection monitoring process that is executed by an external-storage-device monitoring module.

An operation performed by the external-storage-device monitoring module 41 at the time of notifying the application 32 of the external-storage-device-related data is explained with reference to FIG. 11. FIG. 11 is a flowchart of an external-storage-device-connection monitoring process executed by the external-storage-device monitoring module 41. The external-storage-device-connection monitoring process is executed at the time of a process at Step S62 that is explained in the second embodiment.

In a loop process at Steps S71 to S84, the external-storage-device monitoring module 41 executes the following process (Steps S72 to S83) after each predetermined time interval. First, the external-storage-device monitoring module 41 confirms whether a notification is issued from the device driver 212 (Step S72) and determines whether the insertion status of the external storage device into the interface unit 18 has changed (Step S73). Upon determining that the insertion status has not changed, in other words, if issuing of the notification from the device driver 212 is not confirmed (No at Step S73), the external-storage-device monitoring module 41 immediately moves to a process at Step S84.

Upon determining at Step S73 that the insertion status has changed, in other words, if issuing of the notification from the device driver 212 is confirmed (Yes at Step S73), the external-storage-device monitoring module 41 determines, based on a notification content, whether a new external storage device is inserted into the interface unit 18 (Step S74). Upon determining that a new external storage device is not inserted, in other words, upon determining that the external storage device is removed from the interface unit 18 (No at Step S74), the external-storage-device monitoring module 41 specifies, from the external-storage-device control table, the mount path corresponding to the mount point of the external storage device (Step S75), switches to "off", "usage status" corresponding to the mount path (Step S76), treats "external storage device type" and "access mode" as null (Step S77), and moves to the process at Step S84.

Upon determining at Step S74 that a new external storage device is inserted (Yes at Step S74), the external-storage-device monitoring module 41 specifies from the external-storage-device control table, the mount path corresponding to the mount point of the external storage device, and determines whether "usage status" corresponding to the mount path is "off" (Step S79). Upon determining that "usage status" is "on" (No at Step S79), the external-storage-device monitoring module 41 moves to the process at Step S84.

Upon determining at Step S79 that "usage status" is "off" (Yes at Step S79), the external-storage-device monitoring module 41 obtains via the operating system 21, the data related to the newly inserted external storage device (Step S80). Next, the external-storage-device monitoring module 41 records respectively in "external storage device type" and "access mode" of the entry corresponding to the mount path specified at Step S78, the type and the access mode of the external storage device that are obtained at Step S80 (Step S81).

Next, the external-storage-device monitoring module 41 switches to "on", "usage status" of the entry that is recorded at Step S81 (Step S82), notifies the application 32 of each data (external-storage-device-related data) that is recorded in the entry (Step S83), and moves to the process at Step S84.

Thus, according to the third embodiment, each of the printer application 321 and the scanner application 322 does not need to separately obtain the data related to the external storage device. Due to this, the process performed by each application can be simplified.

A fourth embodiment of the present invention is explained next. During formatting of the external storage device by a specific application, if the external storage device is mounted and accessed in response to a request from another application, the formatting is likely to result in failure. To overcome the drawback, in the fourth embodiment, mounting of the external storage device can be prohibited in response to a mounting prohibition request that is output from the specific application. In the fourth embodiment, components that are similar to those of the first to the third embodiments mentioned earlier are indicated by the same reference numerals and an explanation is omitted.

Figures 12, 13:
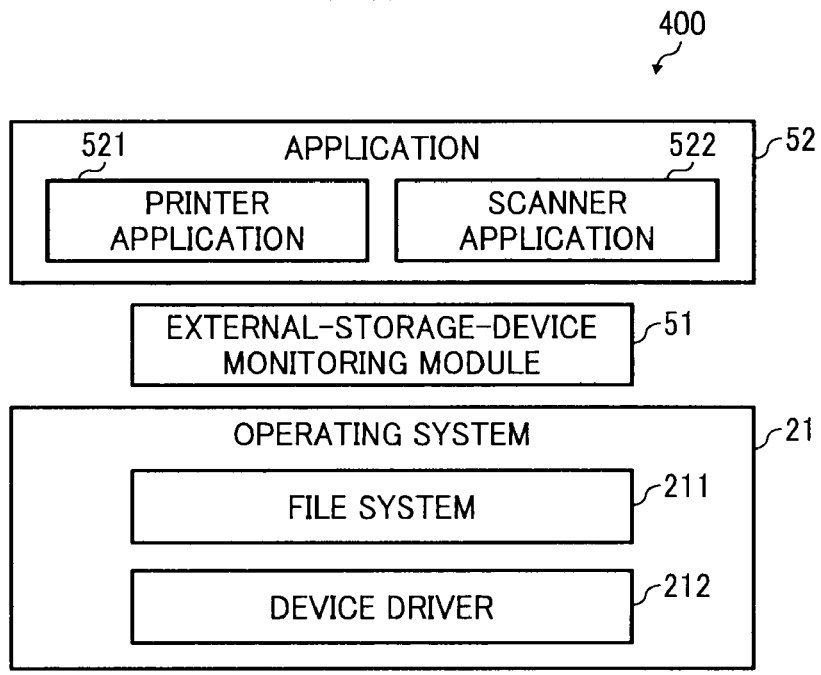
FIG. 12 is a block diagram of an MFP according to a fourth embodiment of the present invention.
FIG. 13 is a schematic diagram of an example of an external-storage-device control table according to the fourth embodiment.

FIG. 12 is a block diagram of an MFP 400 according to the fourth embodiment. Because a hardware configuration of the MFP 400 is similar to that of the MFP 100 shown in FIG. 1, an explanation is omitted.

As shown in FIG. 12, the MFP 400 includes the operating system 21, an external-storage-device monitoring module 51, and an application 52.

Similarly to the application 23 mentioned earlier, the application 52 includes a printer application 521 and a scanner application 522. Apart from including functions that are similar to the functions of the printer application 231 and the scanner application 232 respectively, upon occurrence of a necessity to prohibit access to the external storage device from other applications during formatting of the external storage device, the printer application 521 and the scanner application 522 output to the external-storage-device monitoring module 51, signals that request prohibition of mounting of the external storage device. Hereinafter, the signals are called "mounting prohibition request".

Upon completion of a process on the external storage device along with completion of formatting, each of the printer application 521 and the scanner application 522 output to the external-storage-device monitoring module 51, signals that request a release of access prohibition with respect to the external storage device. Hereinafter, the signals are called "mounting prohibition release request". The mounting prohibition request and the mounting prohibition release request at least include data (for example, the mount point, etc.) for specifying the external storage device that is an operation target.

Apart from including functions that are similar to the respective functions of the external-storage-device monitoring module 22, upon receiving the mounting prohibition request from a specific application (the printer application 521 or the scanner application 522), the external-storage-device monitoring module 51 exercises control not to mount the external storage device that is specified by the mounting prohibition request. Upon receiving the mounting prohibition release request from the specific application (the printer application 521 and the scanner application 522), the external-storage-device monitoring module 51 enables mounting of the external storage device that is specified by the mounting prohibition release request.

Specifically, upon receiving the mounting prohibition request from the specific application, the external-storage-device monitoring module 51 records in the external-storage-device control table that is stored in the storage unit 14, data related to the external storage device that is specified by the mounting prohibition request and the application that has output the mounting prohibition request, thus controlling the status of the external storage device.

FIG. 13 is a schematic diagram of an example of the external-storage-device control table that is stored in the storage unit 14. As shown in FIG. 13, the external-storage-device control table includes three items of "mount path", "prohibition flag", and "application type".

"Mount path" is the mount point of the external storage device controlled by the file system 211. Three mount paths (/mnt/ext1, /mnt/ext2, and /mnt/ext3) are recorded in advance in the external-storage-device control table shown in FIG. 13. Data that indicates whether the external storage device corresponding to the mount path is in a prohibited status is recorded in "prohibition flag". A type of the application that has output the mounting prohibition request is recorded in "application type" (for example, a scanner application, etc.).

Upon receiving the mounting prohibition request from the specific application, the external-storage-device monitoring module 51 switches to "on", "prohibition flag" corresponding to the mount path of the external storage device that is specified by the mounting prohibition request. The external-storage-device monitoring module 51 also records in "application type", the type of the application that has output the mounting prohibition request.

Upon receiving the mounting prohibition release request from the specific application, the external-storage-device monitoring module 51 switches to "off", "prohibition flag" corresponding to the mount path of the external storage device that is specified by the mounting prohibition release request. The external-storage-device monitoring module 51 also treats as null, "application type" that corresponds to "prohibition flag". In the fourth embodiment, mounting prohibition of the external storage device, which is specified by the mounting prohibition request, can be released only by the application that has output the mounting prohibition request. Due to this, upon receiving the mounting prohibition release request from an application different from the application that has transmitted the mounting prohibition request for the same external storage device, the external-storage-device monitoring module 51 discards the mounting prohibition release request.

An operation performed by the external-storage-device monitoring module 51 upon receiving the mounting prohibition request/mounting prohibition release request from the application 52 is explained next.

Figure 14:
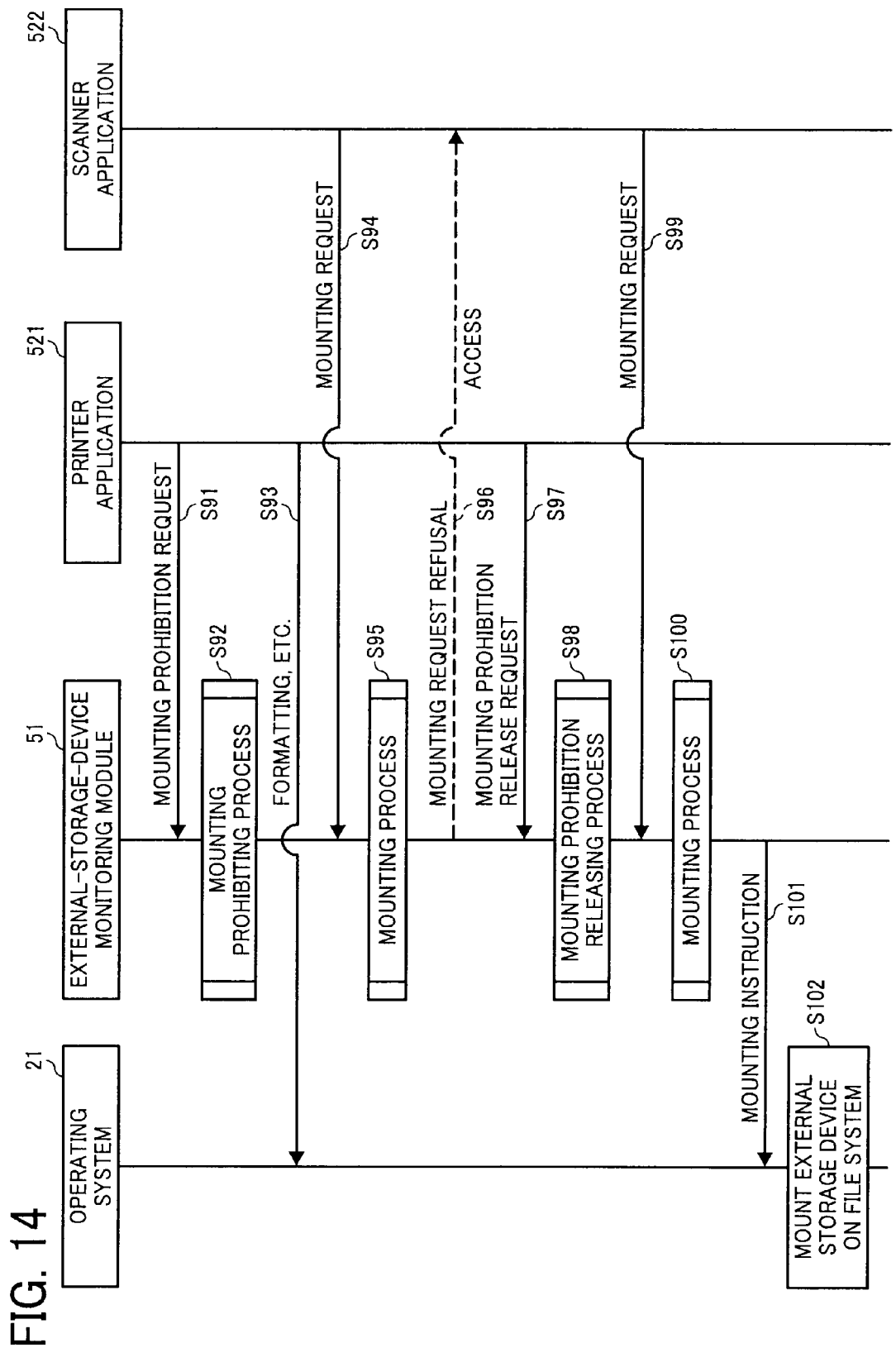
FIG. 14 is a flowchart of a process sequence that is performed at the time of mounting/unmounting of the external storage device.

FIG. 14 is a flowchart of a process sequence that is performed between the operating system 21, the external-storage-device monitoring module 51, and the application 52 (the printer application 521 and the scanner application 522) at the time of mounting/unmounting of the external storage device. In the process, it is prior assumed that the external storage device is already inserted into any one of the SD memory card slot 181 and the USB interface 182 or both, that the external storage device is still not mounted, and that the device driver 212 has notified the external-storage-device monitoring module 51 of the insertion of the external storage device.

Along with formatting of the external storage device, upon occurrence of a necessity to prohibit access to the external storage device, the printer application 521 outputs to the external-storage-device monitoring module 51, a mounting prohibition request of the external storage device (Step S91).

Upon receiving the mounting prohibition request from the printer application 521, the external-storage-device monitoring module 51 executes a mounting prohibiting process (Step S92). The mounting prohibiting process at Step S92 is explained next with reference to FIG. 15.

Figure 15:
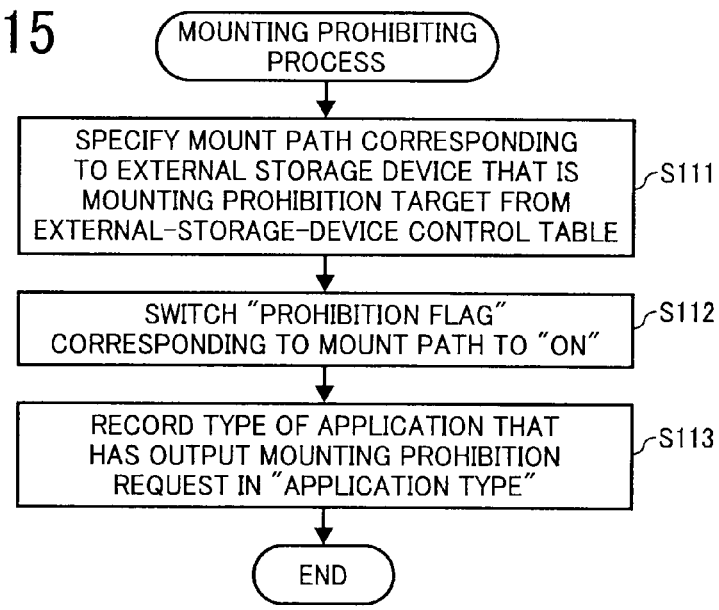
FIG. 15 is a flowchart of a mounting prohibiting process executed by an external-storage-device monitoring module according to the fourth embodiment.

FIG. 15 is a flowchart of the mounting prohibiting process. First, the external-storage-device monitoring module 51 refers to the external-storage-device control table that is stored in the storage unit 14 and specifies the mount point (the mount path) corresponding to the external storage device that is specified by the mounting prohibition request (Step S111).

Next, the external-storage-device monitoring module 51 switches to "on", "prohibition flag" corresponding to the mount path that is specified at Step S111 (Step S112), records in "application type", the type of the application that has output the mounting prohibition request (Step S113), and ends the mounting prohibiting process. For preventing multiple mounting prohibition requests from other applications with respect to the external storage device that is in a mounting prohibited status, an excluding process can also be performed.

Returning to FIG. 14, the printer application 521 executes a predetermined process such as formatting on the external storage device that is a mounting prohibition target (Step S93). Upon the scanner application 522 outputting to the external-storage-device monitoring module 51, a mounting request of the external storage device that is in the mounting prohibited status (Step S94), the external-storage-device monitoring module 51 executes the mounting process based on the mounting request (Step S95). The mounting process at Step S95 is explained next with reference to FIG. 16. The mounting process is executed separately for each external storage device that is a mounting target.

Figure 16:
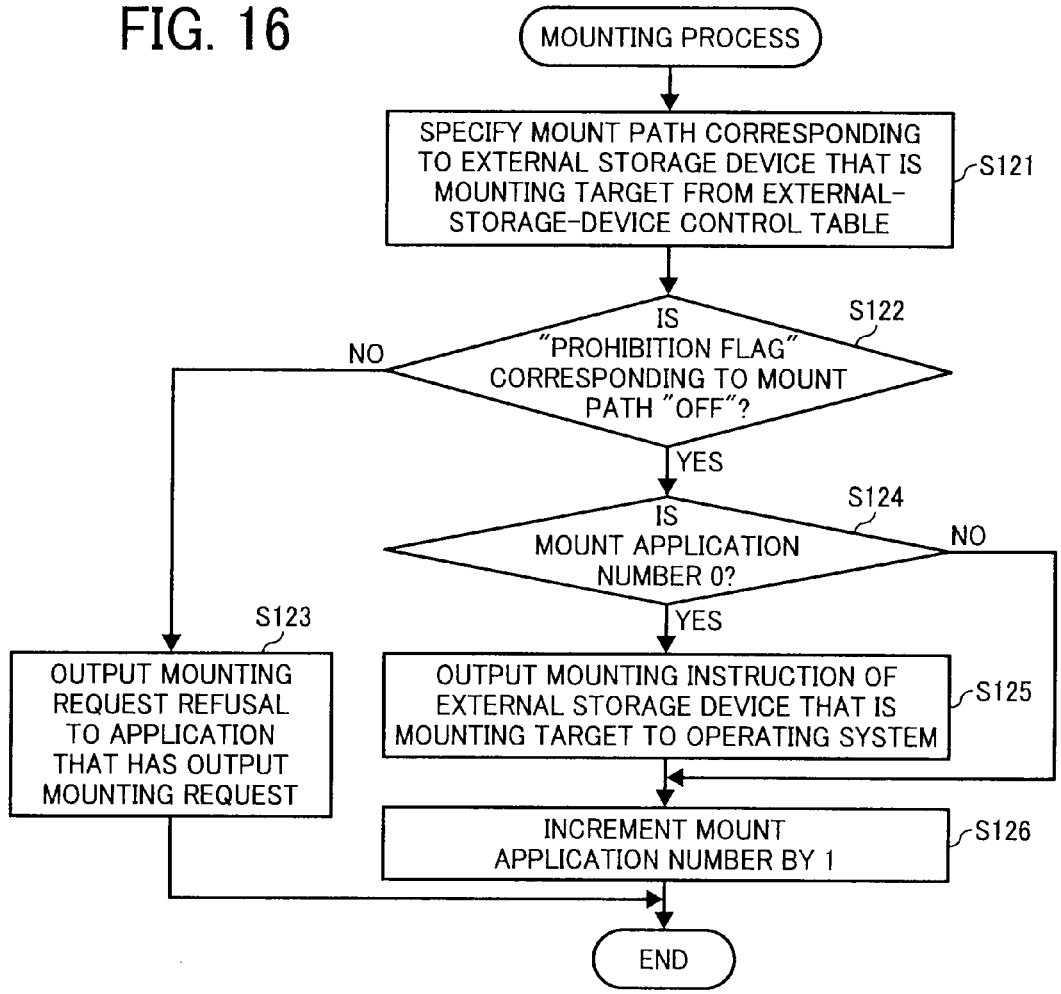
FIG. 16 is a flowchart of a mounting process according to the fourth embodiment.

FIG. 16 is a flowchart of the mounting process according to the fourth embodiment. First, the external-storage-device monitoring module 51 refers to the external-storage-device control table that is stored in the storage unit 14 and specifies the mount point (the mount path) corresponding to the external storage device that is specified by the mounting request (Step S121).

Next, the external-storage-device monitoring module 51 determines whether "prohibition flag" corresponding to the mount path specified at Step S121 is "off" (Step S122). Upon determining that "prohibition flag" is "on" (No at Step S122), the external-storage-device monitoring module 51 outputs to the application that has output the mounting request, signals to the effect that mounting cannot be performed (mounting request refusal) (Step S123), and ends the mounting process.

Upon determining, at Step S122, that "prohibition flag" is "off" (Yes at Step S122), the external-storage-device monitoring module 51 executes a process at Steps S124 to S126. Because the process at Steps S124 to S126 is similar to Steps S21 to S23 of the mounting process that is explained with reference to FIG. 4, an explanation is omitted.

Returning to FIG. 14, it is assumed that the scanner application 522 has issued a mounting request for the external storage device that is in the mounting prohibited status. Due to this, because the external-storage-device monitoring module 51 determines, at Step S122 of the mounting process shown in FIG. 16, that "prohibition flag" is "on", the external-storage-device monitoring module 51 outputs the mounting request refusal to the scanner application 522.

Next, along with completion of the process such as formatting, the printer application 521 outputs a mounting prohibition release request to the external-storage-device monitoring module 51 (Step S97). Based on the mounting prohibition release request, the external-storage-device monitoring module 51 executes a mounting prohibition releasing process (Step S98). The mounting prohibition releasing process at Step S98 is explained next with reference to FIG. 17.

Figure 17:
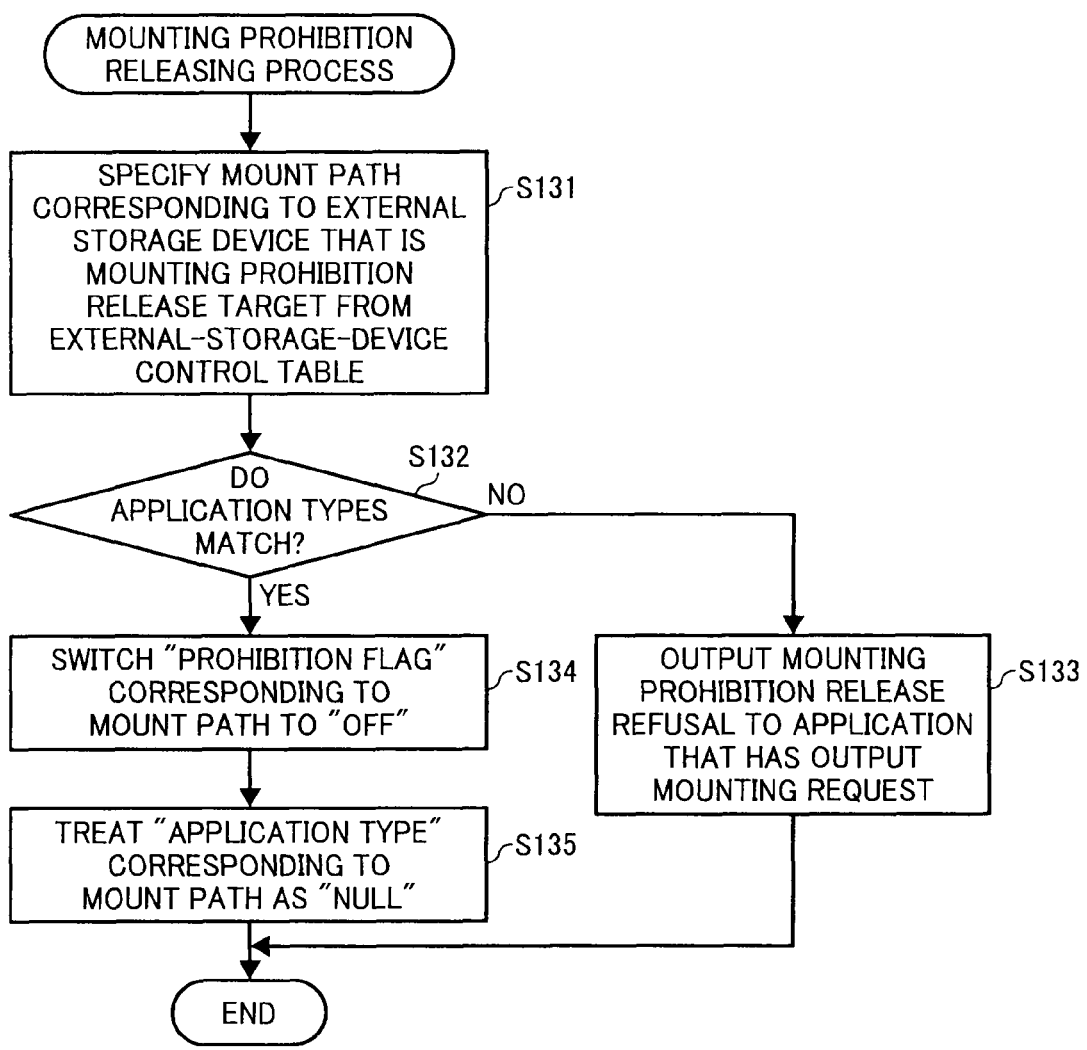
FIG. 17 is a flowchart of a mounting prohibition releasing process executed by the external-storage-device monitoring module according to the fourth embodiment.

FIG. 17 is a flowchart of the mounting prohibition releasing process executed by the external-storage-device monitoring module 51. First, the external-storage-device monitoring module 51 refers to the external-storage-device control table that is stored in the storage unit 14 and specifies the mount point (the mount path) corresponding to the external storage device that is specified by the mounting prohibition release request (Step S131).

Next, the external-storage-device monitoring module 51 determines whether a content of "application type" corresponding to the mount path that is specified at Step S131 matches the type of the application that has output the mounting prohibition release request (Step S132). Upon determining that the content of "application type" does not match the type of the application (No at Step S132), the external-storage-device monitoring module 51 outputs to the application that has issued the mounting prohibition release request, signals (a mounting prohibition release refusal) to the effect that mounting prohibition cannot be released (Step S133), and ends the mounting prohibition releasing process.

Upon determining, at Step S132, that the content of "application type" matches the type of the application (Yes at Step S132), the external-storage-device monitoring module 51 switches to "off", "prohibition flag" corresponding to the mount path that is specified at Step S131 (Step S134), treats "application type" as null" (Step S135), and ends the mounting prohibition releasing process.

Returning to FIG. 14, because the printer application 521 has output the mounting prohibition request at Step S91, the external-storage-device monitoring module 51 determines, at Step S132 of the mounting prohibition releasing process shown in FIG. 17, that the content of "application type" matches the type of the application. Due to this, the external-storage-device monitoring module 51 switches "prohibition flag" to "off", and treats "application type" as null, thus releasing the mounting prohibited status of the external storage device.

After the mounting prohibition releasing process at Step S98, upon the scanner application 522 once again outputting to the external-storage-device monitoring module 51, the mounting request for the external storage device that is the mounting target in the process at Step S96 (Step S99), the external-storage-device monitoring module 51 executes, similarly to the mounting process at Step S95, the mounting process that is explained with reference to FIG. 16 (Step S100). Because the external-storage-device monitoring module 51 determines, at Step S122 of the mounting process shown in FIG. 16, that "prohibition flag" is "off", the external-storage-device monitoring module 51 instructs the operating system 21 to mount the external storage device that is specified by the mounting request (Step S101).

Upon receiving from the external-storage-device monitoring module 51, the instruction to mount the external storage device, the operating system 21 mounts the specified external storage device on the file system 211 (Step S102).

When unmounting the mounted external storage device, the external-storage-device monitoring module 51 executes the unmounting process that is similar to the unmounting process explained in the first embodiment.

Thus, according to the fourth embodiment, in response to the mounting prohibition request from any one of the printer application 521 and the scanner application 522, the external-storage-device monitoring module 51 enables exclusive usage of the external storage device by the application 52. Due to this, an exclusive process on the external storage device such as formatting can be reliably performed.

The invention is not limited to the first to the fourth embodiments shown and described herein, and various modifications can be made without departing from the scope of the invention in an execution phase. For example, several constituent elements can be omitted from the constituent elements that are shown in the embodiments described herein. Constituent elements according to other embodiments can also be appropriately combined.

For example, computer programs related to various processes that are executed by the MFP mentioned earlier can be stored on a computer that is connected to a network such as the Internet. The stored computer programs can be provided by downloading via the network. The computer programs related to various processes that are executed by the MFP mentioned earlier can also be provided or distributed via the network such as the Internet.

The computer programs related to various processes that are executed by the MFP mentioned earlier can also be embedded in advance into a storage medium such as a ROM and provided.

According to an aspect of the present invention, unmounting of an external storage device can be performed in units of application program without necessitating an explicit unmounting instruction from a user. Each application program can independently perform mounting/unmounting of the external storage device without interfering other application programs.

According to another aspect of the present invention, unmounting of the external storage device during an access to the external storage device can be prevented.

According to still another aspect of the present invention, a process performed by each application program can be simplified.

According to still another aspect of the present invention, an exclusive process on the external storage device such as formatting can be reliably performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus comprising:
an operating system that performs a mounting and an unmounting of a removable external storage device;
a plurality of application programs each configured to independently access the external storage device; and
an external-storage-device monitoring unit that instructs the operating system, based on a request output from each of the plurality of application programs, to perform the mounting and the unmounting of the external storage device, wherein
an unmounting request for the external storage device is output from at least one of the plurality of application programs, the unmounting request being independent of a user instruction,
the plurality of application programs includes a first application program and a second application program,
the external-storage-device monitoring unit determines whether a mounting request from the second application program has been received, in response to receiving an unmounting request from the first application program,
the external-storage-device monitoring unit maintains the external storage device mounted, in response to a determination that the mounting request is received from the second application program,
the external-storage-device monitoring unit performs the unmounting of the external storage device in response to a determination that the mounting request has not been received from the second application program,
when the first application program and the second application program are engaged in the external storage device, the external-storage-device monitoring unit maintains the external storage device mounted while the first application program is using the external storage device, in response to receiving an unmounting request from the second application program, and
the external-storage-device monitoring unit is implemented as hardware or as a hardware and software combination.

2. The data processing apparatus according to claim 1, further comprising:
a detecting unit that detects an insertion of the external storage device; and
an insertion-status notifying unit that notifies, when the detecting unit detects the insertion of the external device, the plurality of application programs that the external device is inserted.

3. The data processing apparatus according to claim 2, wherein the insertion-status notifying unit further notifies the plurality of application programs of information on the external storage device when the detecting unit detects the insertion of the external device.

4. The data processing apparatus according to claim 1, wherein when a mounting prohibition request is issued from any one of the plurality of application programs, the external storage-device monitoring unit prohibits the mounting of the external storage device.

5. The data processing apparatus according to claim 4, wherein the external storage-device monitoring unit receives a mounting prohibition release request exclusively from an application program of the plurality of application programs that issued the mounting prohibition request.

6. A data processing method that is performed in a data processing apparatus that includes a data processor, and that includes an operating system that performs a mounting and an unmounting of a removable external storage device, and a plurality of application programs each configured to independently access the external storage device, the data processing method comprising:
instructing the operating system, using the data processor of the data processing apparatus, based on a request output from each of the plurality of application programs, to perform the mounting and the unmounting of the external storage device, an unmounting request for the external storage device being output from at least one of the plurality of application programs, the unmounting request being independent of a user instruction, the plurality of application programs including a first application program and a second application program;
determining whether a mounting request from the second application program has been received, in response to receiving an unmounting request from the first application program;
instructing the operating system to maintain the external storage device mounted, in response to a determination that the mounting request is received from the second application program;
instructing the operating system to perform the unmounting of the external storage device in response to a determination that the mounting request has not been received from the second application program; and
when the first application program and the second application program are engaged in the external storage device, instructing the operating system to maintain the external storage device mounted while the first application program is using the external storage device, in response to receiving an unmounting request from the second application program.

7. The data processing method according to claim 6, further comprising:
detecting an insertion of the external storage device; and
notifying, when the insertion of the external storage device is detected at the detecting, the plurality of application programs that the external device is inserted.

8. The data processing method according to claim 7, wherein the notifying further includes notifying the plurality of application programs of information on the external storage device when the insertion of the external device is detected at the detecting.

9. The data processing method according to claim 6, wherein when a mounting prohibition request is issued from any one of the plurality of application programs, the instructing includes prohibiting the mounting of the external storage device.

10. The data processing method according to claim 9, wherein the instructing includes receiving a mounting prohibition release request exclusively from an application program of the plurality of application programs that issued the mounting prohibition request.

* * * * *